United States Patent [19]
Allen

[11] 3,717,178
[45] Feb. 20, 1973

[54] SAFETY VALVE — BELLEVILLE
[75] Inventor: Thomas E. Allen, Mustang, Okla.
[73] Assignee: Caterpiller Tractor Co., Peoria, Ill.
[22] Filed: July 19, 1971
[21] Appl. No.: 163,595

[52] U.S. Cl..............................137/610, 251/DIG. 3
[51] Int. Cl..............................................F16k 11/14
[58] Field of Search ..............137/610, 608; 251/337; 267/15 R, 11 R

[56] References Cited
UNITED STATES PATENTS

| | | | |
|---|---|---|---|
| 3,442,290 | 5/1969 | Phillips | 137/512.1 X |
| 3,151,628 | 10/1964 | Heckert | 251/DIG. 3 |
| 3,160,071 | 12/1964 | Kandelman | 251/DIG. 3 |
| 3,169,550 | 2/1965 | Reader | 251/DIG. 3 |

FOREIGN PATENTS OR APPLICATIONS

| | | | |
|---|---|---|---|
| 5,502 | 1880 | Great Britain | 251/DIG. 3 |
| 15,970 | 1914 | Great Britain | 251/DIG. 3 |
| 226,777 | 10/1910 | Germany | 251/DIG. 3 |
| 711,693 | 6/1931 | France | 251/DIG. 3 |

Primary Examiner—Samuel Scott
Attorney—Charles M. Fryer et al.

[57] ABSTRACT

A safety valve for use in conjunction with the controls of a hydraulic transmission utilizes alternate stacks of Belleville springs which are selectively biased to divert a flow of fluid to or away from the activating elements of the transmission. The valve is pre-biased to divert fluid away from the controls when the vehicle engine is started until the drive selector is put in the neutral position.

6 Claims, 2 Drawing Figures

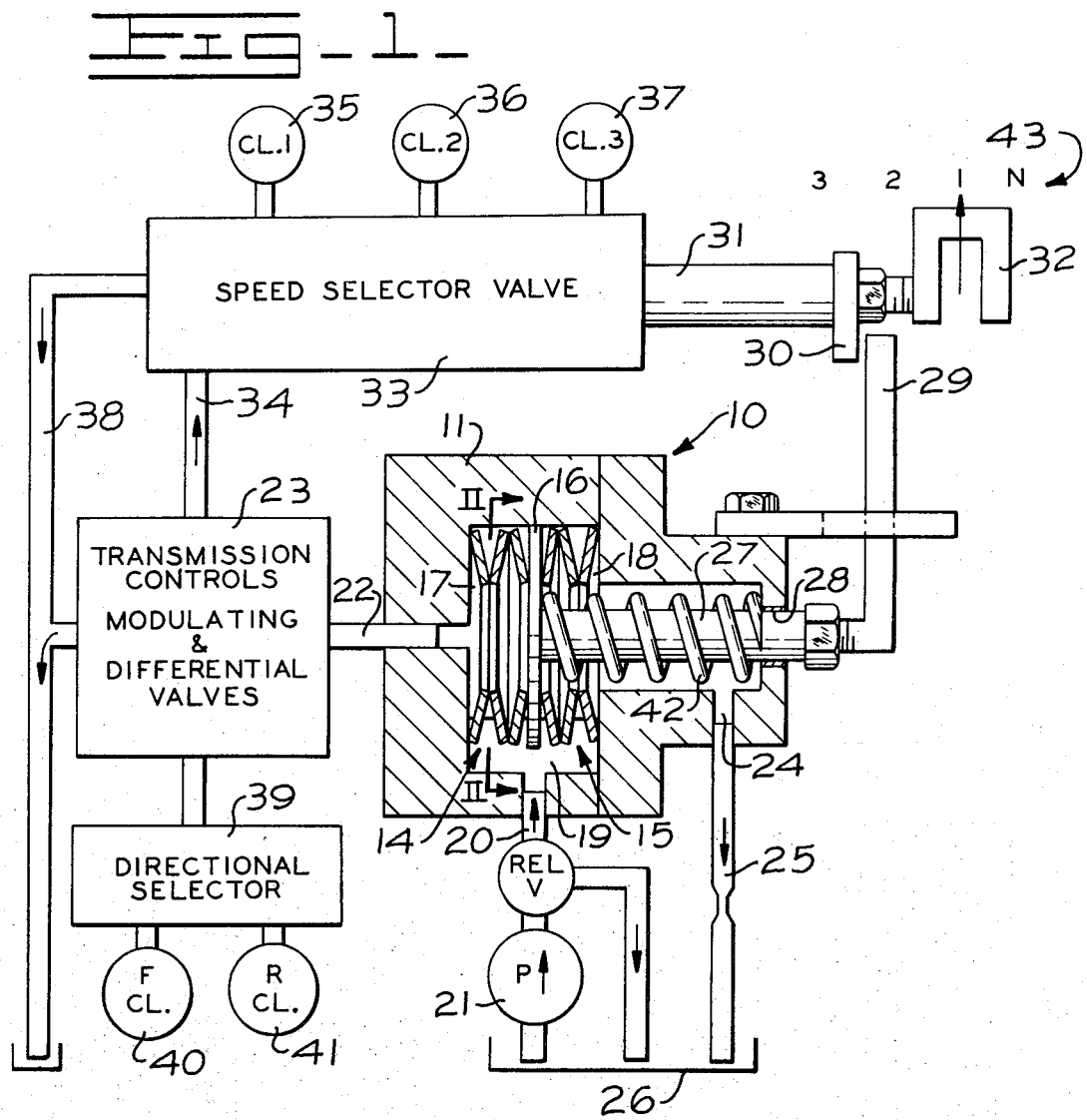
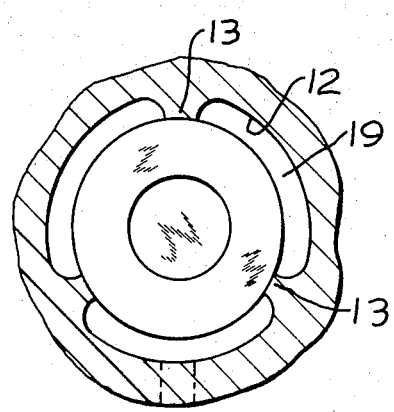

SAFETY VALVE — BELLEVILLE

BACKGROUND ON THE INVENTION

The present invention relates to valves and pertains more particularly to a safety valve for the hydraulic controls of a transmission.

Because of their many advantages, hydraulically controlled automatic transmissions are becoming quite common in motor vehicles including heavy duty construction equipment. Such transmissions, however, have a disadvantage in that they permit the engine to start without the operator being aware that the transmission is in drive position. This is because fluid pressure necessary to activate the automatic controls is not present until the engine has run for a moment. Thus, the transmission is normally not operative until after the engine has run for a moment and has built up sufficient pressure in the hydraulic system to actuate the automatic transmission controls. The vehicle may then unexpectedly lurch into motion out of control. This presents a very dangerous situation likely to cause severe personal injury and property damage. For this reason numerous safety devices have been developed for such vehicles. These safety devices, however, have not been satisfactory for heavy duty equipment.

Heavy duty equipment is normally diesel powered and thus cannot employ the normal ignition cut out as employed in the gasoline powered automobile. Transmission locks developed for such vehicles also have numerous disadvantages. First of all, the exterior transmission location of the safety control linkage renders it subject to maladjustment, corrosion and tampering. Secondly, they employ complex linkages and elements which are space consuming. Also, they normally employ close fitting parts which are sluggish in operation and are expensive to manufacture.

SUMMARY OF THE INVENTION

The primary object of the present invention is to provide a safety valve for hydraulic transmissions which overcomes the above disadvantage of the prior art devices.

Another object of the present invention is to provide a safety valve for automatic transmissions that is compact, inexpensive and reliable.

A further object of the present invention is to provide an improved safety valve for hydraulic systems that is compact, inexpensive and reliable.

In accordance with the present invention a valve is provided which automatically directs control fluid to exhaust when the system has been started up after having been closed down. More particularly, a series of Belleville type spring washers is arranged in conjunction with control means to automatically exhaust control fluid when a system is closed down. The valve must then be deliberately moved to a control position when the system is restarted.

BRIEF DESCRIPTION OF THE DRAWINGS

The above and other objects and advantages of the present invention will become apparent from the following description when read in conjunction with the accompanying drawing in which:

FIG. 1 is a sectional view of a preferred embodiment of the present invention shown in conjunction with the schematic illustration of a hydraulic control system;

FIG. 2 is a view taken generally along lines II—II of FIG. 1.

DESCRIPTION OF PREFERRED EMBODIMENT

Referring now to the drawings, and in particular to FIG. 1, there is illustrated a safety valve assembly generally designated by the numeral 10 comprising a housing 11 forming a chamber, the walls 12 of which include a plurality of inwardly directing ribs 13 which supports two sets 14 and 15 of frusto-conical springs commonly referred to as Belleville washers. The two sets of washers 14 and 15 are separated by means of a flat circular disc 16 and cooperate therewith to form a pair of central cavities 17 and 18 and with the wall 12 of the housing to form an annular chamber or cavity 19. An inlet opening 20 communicates with the annular chamber or cavity 19 and a source 21 of pressurized fluid. An outlet opening 22 provides communications between the cavity 17 and transmission controls such as, for example, the modulating and differential valves of copending application Ser. No. 738,261, now U.S. Pat. No. 3,481,435, issued Dec. 2, 1969, assigned to the applicant's assignee. An outlet opening 24 provides communication between cavity 18 by means such as a conduit 25 to the supply tank or sump 26. A control rod 27 is operatively connected to disc 16 and extends through an opening 28 in the housing and has an arm or extension 29 to be engaged such as by means of an abutment or extension 30 carried by control linkage 31.

The control linkage 31 is connected such as by a yoke 32 to a suitable manual selector lever (not shown) and to a speed selector valve schematically illustrated at 33. The speed selector valve 33 functions in the control system schematically shown to direct a flow of pressurized fluid which is supplied such as by conduit 34 from transmission control 23 to selected ones of a plurality of clutches 35, 36 and 37. A conduit 38 conducts fluid from valve 33 or control 23 back to the reservoir 26. The control system includes a directional selector 39 for selecting the direction of operation such as by engaging clutch elements 40 and 41 respectively.

An understanding of the operation of valve 10 can best be understood by considering in conjunction with operation of the overall control system. Considering this system in its pre-operational stage, that is, prior to the direction of any pressurized fluid into the lines of the system, a spring 42 of a predetermined pre-load biases disc 16 to the left in tight engagement with the stack of spring washers 14. This bias has the effect of sealing the abutting areas at the internal diameter against a flow of fluid thereby into the cavity 17. The selected bias of the two stacks of springs 14 and 15 are preferably selected such that this bias has the effect of relieving all or substantially all of the bias of the stack of springs 15 thereby making it possible for pressurized fluid from the annular chamber or cavity 19 to flow past the springs and into the cavity 18 and from there via outlet 24 and a conduit 25 back to the sump or storage reservoir 26. This would be the normal operation of the system of the valve in the control system of a transmission when the vehicle has been started up after the selector controls of the transmission means have been left in a drive position such as 1, 2 or 3 as indicated by scale 43 above yoke 32.

In order for the control system to obtain sufficient fluid pressure to engage the drive brakes or clutches, a flow of pressurized fluid must pass between stack of washers 14 into cavity 17 via outlet 22 into the transmission controls 23 and from there to the various selected clutch or brake elements. In order to direct a flow of fluid in this manner, for proper operation of the transmission, the drive selector of the system as illustrated must be put in the neutral position. When this is done, abutting member or extension 30 engages arm 29 forcing control rod 27 and disc 16 to the right and into a tight engagement with the stack of spring washers 15 thereby sealing the contacting surfaces thereof against a passage of fluid from the annular chamber or cavity 19 thereby into the internal cavity 18. This simultaneously relaxes the pressure on springs 14, permitting pressurized fluid to pass beyond the springs into chamber 17 and by means of outlet opening 22 into the control system 23.

When the pressurized fluid in chamber 17 reaches such pressure as to permit operation of the controls, it applies a pressure along the face of disc 16 which is sufficient to overcome the force of the bias of spring 42 and thereby maintain the springs 15 compressed in tight engagement and thereby preventing a flow of fluid thereby. If the vehicle engine is stopped with the system in drive as illustrated, the pressure chamber 17 will leak out thus spring 42 will again bias disc 16 into tight engagement with the springs 14 and again seal against the passage of fluid into chamber 17 when the engine is started again and pressure in a pump 21 causes fluid pressure to build up in chamber 19.

Thus, from the above description, it can be seen that I have disclosed a valve assembly for use in a hydraulic transmission control system, which valve assembly utilizes a plurality of Belleville type springs for valving elements and is responsive to a loss of pressure on the control system side of the valve to divert a new supply of pressurized fluid away from the control system to the sump until the control selector is put into neutral position.

What is claimed is:

1. A bistable safety valve, said valve comprising:
   a housing having a chamber formed therein;
   at least two sets of Belleville type springs arranged in said housing in serial engagement;
   an inlet opening in said housing for communicating a pressurized fluid to the outer diameter of said springs;
   an outlet opening communicating with the internal diameters of each of said sets of springs;
   control means operatively engaging said sets of springs and cooperative therewith to maintain a pre-selected position in response to flow of pressurized fluid into said chamber;
   one of said outlet openings communicates with a sump;
   the other of said openings communicates with a hydraulic control system; and,
   spring means in addition to said Belleville springs for normally biasing said control means toward the set of springs which have their inner diameters in communication with said control system.

2. The valve as defined in claim 1 wherein said control means is responsive to fluid pressure within the inner diameter one of said sets of springs to seat the other sets of springs against pressurized fluid from said annular chamber.

3. A bistable safety valve, said valve comprising:
   a housing having a chamber formed therein;
   at least two sets of Belleville type spring washers arranged in said housing in series engagement, forming an annular chamber around the outer diameter thereof;
   a disc member positioned between said sets of washers and cooperative therewith to form first and second cavities therein;
   an inlet opening in said housing for communicating a pressurized fluid to said annular chamber;
   an outlet opening communicating with each of said cavities; and,
   control means operatively associated with said disc member to selectively bias said disc into compressive engagement with one of said set of washers to thereby divert pressurized fluid from said annular chamber to one of said cavities.

4. The valve of claim 3 wherein one of said outlet openings provides communications between said first cavity and a sump; and,
   the other of said openings communicates with said second cavity and a hydraulic control system.

5. The valve as defined in claim 3 comprising spring means for normally biasing said disc toward the cavity which is in communication with said control system.

6. The valve as defined in claim 5 wherein said disc member is responsive to fluid pressure in said second cavity to seal said first cavity against pressurized fluid from said annular chamber.

* * * * *